(12) United States Patent
Lee et al.

(10) Patent No.: US 11,165,275 B2
(45) Date of Patent: Nov. 2, 2021

(54) CHARGING SYSTEM AND METHOD USING MOTOR DRIVING SYSTEM

(71) Applicants: HYUNDAI MOTOR COMPANY, Seoul (KR); KIA MOTORS CORPORATION, Seoul (KR)

(72) Inventors: Yong Jae Lee, Hwaseong-si (KR); Jae Ho Hwang, Daejeon (KR); Joo Young Park, Yongin-si (KR); Su Hyun Bae, Daegu (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 26 days.

(21) Appl. No.: 16/743,912

(22) Filed: Jan. 15, 2020

(65) Prior Publication Data
US 2021/0061118 A1 Mar. 4, 2021

(30) Foreign Application Priority Data
Aug. 30, 2019 (KR) .................. 10-2019-0107407

(51) Int. Cl.
| | |
|---|---|
| *H02J 7/00* | (2006.01) |
| *H02J 7/34* | (2006.01) |
| *B60L 53/53* | (2019.01) |
| *H02P 27/06* | (2006.01) |
| *B60L 58/13* | (2019.01) |
| *B60K 6/28* | (2007.10) |

(52) U.S. Cl.
CPC .............. *H02J 7/342* (2020.01); *B60L 53/53* (2019.02); *B60L 58/13* (2019.02); *H02J 7/0047* (2013.01); *H02P 27/06* (2013.01); *B60K 6/28* (2013.01); *B60L 2210/10* (2013.01); *B60Y 2200/91* (2013.01); *B60Y 2200/92* (2013.01); *B60Y 2300/91* (2013.01); *H02J 2207/20* (2020.01)

(58) Field of Classification Search
CPC ...... H02J 7/342; H02J 7/0047; H02J 2207/20; B60L 53/53; B60L 58/13; B60L 2210/10; H02P 27/06; B60Y 2300/91; B60Y 2200/92; B60K 6/28
See application file for complete search history.

(56) References Cited

U.S. PATENT DOCUMENTS

| | | | | |
|---|---|---|---|---|
| 7,688,024 B2* | 3/2010 | Kamaga | .................... | H02J 7/14 320/104 |
| 8,045,301 B2* | 10/2011 | Shiba | ........................ | B60L 9/18 361/23 |
| 8,122,984 B2* | 2/2012 | Miwa | ...................... | B60K 15/05 180/65.27 |
| 8,441,225 B2* | 5/2013 | Naruse | .............. | H02M 7/53875 318/801 |

(Continued)

FOREIGN PATENT DOCUMENTS

| | | |
|---|---|---|
| JP | 2012196105 A * | 10/2012 |
| KR | 10-2018-0060454 A | 6/2018 |

(Continued)

*Primary Examiner* — Naum Levin
(74) *Attorney, Agent, or Firm* — Mintz Levin Cohn Ferris Glovsky and Popeo, P.C.; Peter F. Corless (57) ABSTRACT

A charging system and a charging method using a motor driving system are disclosed which may enable charging between vehicles each having a battery for providing power to a vehicle driving motor, such as electric vehicles or plug-in hybrid vehicles.

12 Claims, 9 Drawing Sheets

(56) References Cited

U.S. PATENT DOCUMENTS

| | | | |
|---|---|---|---|
| 9,260,022 B2* | 2/2016 | Yang | B60L 3/003 |
| 9,290,105 B2* | 3/2016 | Zhao | B60L 58/12 |
| 9,969,290 B2* | 5/2018 | Tang | B60L 58/10 |
| 2014/0354195 A1* | 12/2014 | Li | B60L 55/00 |
| | | | 318/139 |
| 2019/0359073 A1* | 11/2019 | Song | H02J 7/0063 |
| 2020/0298722 A1* | 9/2020 | Smolenaers | B60L 53/24 |
| 2020/0373781 A1* | 11/2020 | Lee | B60L 1/006 |

FOREIGN PATENT DOCUMENTS

| | | |
|---|---|---|
| KR | 10-2019-0119778 | 10/2019 |
| KR | 10-2020-0068175 A | 6/2020 |
| KR | 10-2020-0075937 A | 6/2020 |

\* cited by examiner

CHARGING SYSTEM AND METHOD USING MOTOR DRIVING SYSTEM

CROSS-REFERENCE TO RELATED APPLICATION

The present application claims priority to and the benefit of Korean Patent Application No. 10-2019-0107407, filed on Aug. 30, 2019, which is incorporated herein by reference in its entirety.

TECHNICAL FIELD

The present disclosure relates to a charging system using a motor driving system, and more particularly to a charging system and method using a motor driving system in which inter-vehicle charging may be performed using the motor driving system, provided in a vehicle.

BACKGROUND

The statements in this section merely provide background information related to the present disclosure and may not constitute prior art.

In general, an electric vehicle or a plug-in hybrid vehicle may receive power provided from external charging equipment, charge a battery therein with the received power, and drive a motor using electrical energy stored in the charged battery to generate power thereof.

Methods of charging a battery in a vehicle may roughly be classified into two charging types, a slow charging type of charging the battery relatively slowly using an on-board charger which receives external alternating current (AC) charging power and converts the received AC charging power into direct current (DC) charging power of a level appropriate to charge the battery, and a quick charging type of providing external DC charging power directly to the battery to charge the battery quickly.

On the other hand, in a vehicle in which a battery should be charged with external power, such as an electric vehicle or a plug-in hybrid vehicle, inter-vehicle charging is not easy when the battery needs to be charged under the condition that there is no external charging equipment. A battery for electric components employed in a general engine vehicle is low in voltage, and can be charged using an alternator provided in the vehicle after the vehicle is started. In contrast, a motor driving battery of an electric vehicle or a plug-in hybrid vehicle is high in voltage, and can be charged with charging current which should be supplied at a stable voltage for a certain time. As a result, it is very hard to charge the motor driving battery of the electric vehicle or plug-in hybrid vehicle through an inter-vehicle electrical connection.

For this reason, conventionally, a battery charging service has been separately provided in a place where there is no charging equipment, by providing a separate service vehicle for charging of an electric vehicle or a plug-in hybrid vehicle and providing the service vehicle with a charging converter capable of stably supplying a charging voltage and charging current.

In this conventional charging method, a charging service vehicle and a dedicated charging converter equipped in the charging service vehicle should be provided, causing an additional cost for service maintenance. This additional cost is reflected in the vehicle price, resulting in an increase in the vehicle price.

SUMMARY

Therefore, the present disclosure provides a charging system and method using a motor driving system which may enable charging between vehicles each having a battery for providing power to a vehicle driving motor, such as electric vehicles or plug-in hybrid vehicles, and improve charging efficiency.

In one form of the present disclosure, the above and other objects can be accomplished by the provision of a charging system using a motor driving system, including first and second vehicles, each of the vehicles including a battery, an inverter having a direct current (DC) link connected to the battery, a plurality of motor connection terminals and a plurality of switching devices provided between the DC link and the plurality of motor connection terminals, a motor having a plurality of coils connected respectively to the plurality of motor connection terminals at their one ends and connected to one another at their other ends to form a neutral point, and a controller for determining a duty of the plurality of switching devices to control a voltage or current of the neutral point, wherein, when the battery in the first vehicle or second vehicle is charged by electrically interconnecting the neutral point in the first vehicle and the neutral point in the second vehicle, one of the controllers of the first and second vehicles controls the plurality of switching devices of the inverter in a corresponding one of the first and second vehicles such that the voltage of each of the neutral points becomes a predetermined target voltage, and the other controls the plurality of switching devices of the inverter in a corresponding one of the first and second vehicles such that the current of each of the neutral points becomes predetermined target current.

The controllers of the first and second vehicles may compare respective available voltages of the first and second vehicles obtained by subtracting respective predetermined margins of the first and second vehicles respectively from respective voltages of the DC links of the first and second vehicles, with each other, and determine a lower one of the available voltages as the target voltage.

The controller of one of the first and second vehicles having the lower available voltage may control the duty of the plurality of switching devices of the inverter in the one vehicle such that the voltage of each of the neutral points becomes the target voltage, and the controller of the other vehicle having a higher one of the available voltages may control the duty of the plurality of switching devices of the inverter in the other vehicle such that the current of each of the neutral points becomes the predetermined target current.

The controllers of the first and second vehicles may obtain respective available voltages of the first and second vehicles by subtracting respective predetermined margins of the first and second vehicles respectively from respective voltages of the DC links of the first and second vehicles, compare the available voltage of one of the first and second vehicles with the DC link voltage of the other vehicle, and determine the compared DC link voltage as the target voltage when the available voltage of the one vehicle is higher than the DC link voltage of the other vehicle.

The controller of the other vehicle having the compared DC link voltage may control the duty of the plurality of switching devices of the inverter in the other vehicle such that the voltage of each of the neutral points becomes the target voltage, and the controller of the one vehicle having the compared available voltage may control the duty of the plurality of switching devices of the inverter in the one vehicle such that the current of each of the neutral points becomes the predetermined target current.

The other vehicle having the compared DC link voltage further may include a relay provided between the neutral point and DC link therein, wherein the controller of the other vehicle having the compared DC link voltage may close the relay such that the voltage of each of the neutral points becomes the compared DC link voltage, and the controller of the one vehicle having the compared available voltage may control the duty of the plurality of switching devices of the inverter in the one vehicle such that the current of each of the neutral points becomes the predetermined target current.

In another form of the present disclosure, there is provided a charging method using the foregoing charging system, including detecting, by the controllers of the first and second vehicles, respective voltages of the DC links of the first and second vehicles, respectively, and obtaining respective available voltages of the first and second vehicles by subtracting respective predetermined margins of the first and second vehicles respectively from the detected DC link voltages, setting, by the controllers of the first and second vehicles, the target voltage of each of the interconnected neutral points of the motors based on the DC link voltages and available voltages of the first and second vehicles, and controlling, by one of the controllers of the first and second vehicles, the plurality of switching devices of the inverter in a corresponding one of the first and second vehicles such that the voltage of each of the neutral points becomes the target voltage, and controlling, by the other, the plurality of switching devices of the inverter in a corresponding one of the first and second vehicles such that the current of each of the neutral points becomes the predetermined target current.

The setting may include comparing the available voltages of the first and second vehicles with each other and determining a lower one of the available voltages as the target voltage.

The controlling may include controlling, by the controller of one of the first and second vehicles having the lower available voltage, the duty of the plurality of switching devices of the inverter in the one vehicle such that the voltage of each of the neutral points becomes the target voltage, and controlling, by the controller of the other vehicle having a higher one of the available voltages, the duty of the plurality of switching devices of the inverter in the other vehicle such that the current of each of the neutral points becomes the predetermined target current.

The setting may include comparing the available voltage of one of the first and second vehicles with the DC link voltage of the other vehicle, and determining the compared DC link voltage as the target voltage when the available voltage of the one vehicle is higher than the DC link voltage of the other vehicle.

The controlling may include controlling, by the controller of the other vehicle having the compared DC link voltage, the duty of the plurality of switching devices of the inverter in the other vehicle such that the voltage of each of the neutral points becomes the target voltage, and controlling, by the controller of the one vehicle having the compared available voltage, the duty of the plurality of switching devices of the inverter in the one vehicle such that the current of each of the neutral points becomes the predetermined target current.

The other vehicle having the compared DC link voltage further may include a relay provided between the neutral point and DC link therein, wherein the controlling may include closing, by the controller of the other vehicle having the compared DC link voltage, the relay such that the voltage of each of the neutral points becomes the compared DC link voltage, and controlling, by the controller of the one vehicle having the compared available voltage, the duty of the plurality of switching devices of the inverter in the one vehicle such that the current of each of the neutral points becomes the predetermined target current.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

Reference will now be made in detail to the preferred forms of the present disclosure, examples of which are illustrated in the accompanying drawings. Wherever possible, the same reference numbers will be used throughout the drawings to refer to the same or like parts.

Figure 1:
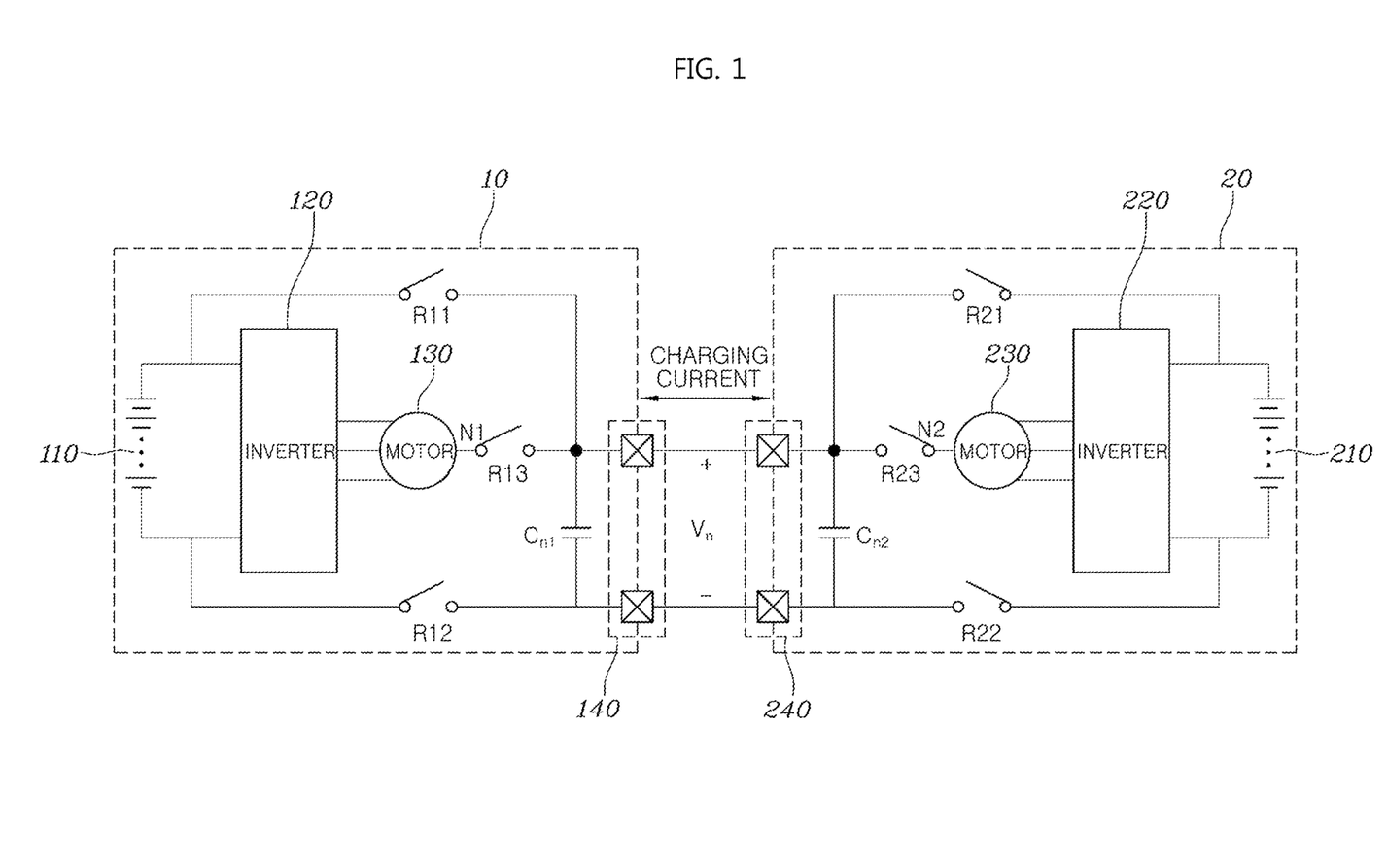
FIG. 1 is a view showing the configuration of a charging system using a motor driving system in one form of the present disclosure.

FIG. 1 shows the configuration of a charging system using a motor driving system in some forms of the present disclosure.

Referring to FIG. 1, the charging system in some forms of the present disclosure may include a first vehicle 10 including a battery 110, an inverter 120 and a motor 130, and a second vehicle 20 including a battery 210, an inverter 220 and a motor 230. The battery in any one of the two vehicles 10 and 20 may be charged by interconnecting neutral points N1 and N2 of the motors 130 and 230 included respectively in the two vehicles 10 and 20 and supplying charging current from one of the vehicles 10 and 20 to the other through the neutral points N1 and N2.

In FIG. 1, the vehicles 10 and 20 may include relays R11, R12 and R13, and R21, R22 and R23, respectively, which may be controlled in an appropriate manner to be open/closed according to whether the motors of corresponding ones of the vehicles are driven or the batteries of the corresponding vehicles are charged. Further, the vehicles 10 and 20 may include external connection ports 140 and 240, respectively, each of which may include a terminal connected to a corresponding one of the neutral points N1 and N2, and a terminal connected to a negative terminal (a reference point determining a voltage level) of a corresponding one of the batteries 110 and 210. In vehicle charging, the terminals of the two external connection ports 140 and 240 connected to the neutral points N1 and N2 may be connected to each other, and the terminals of the external connection ports 140 and 240 connected to the negative terminals of the batteries 110 and 210 may be electrically connected to each other. The electrical connection between the two external connection ports 140 and 240 may be made through an appropriate cable capable of accepting the amount of incoming/outgoing charging current and the level of a terminal voltage Vn in battery charging. The connection between this cable and each of the external connection ports 140 and 240 may be made through a connector of an appropriate standard.

Figure 2:
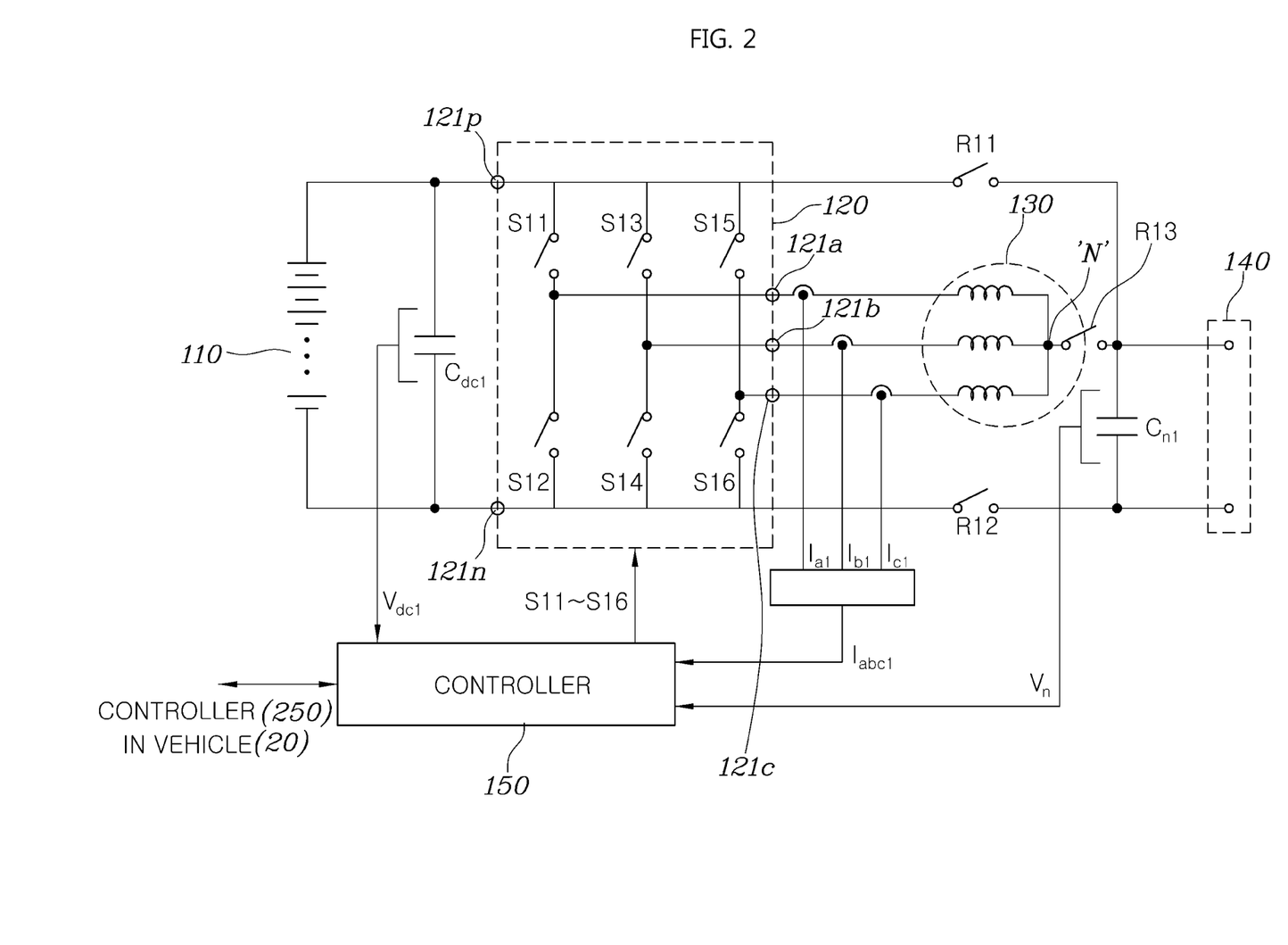
FIGS. 2 and 3 are detailed circuit diagrams of motor driving systems provided in respective vehicles and used for battery charging and charging power supply in a charging system using a motor driving system in one form of the present disclosure.
Figure 3:
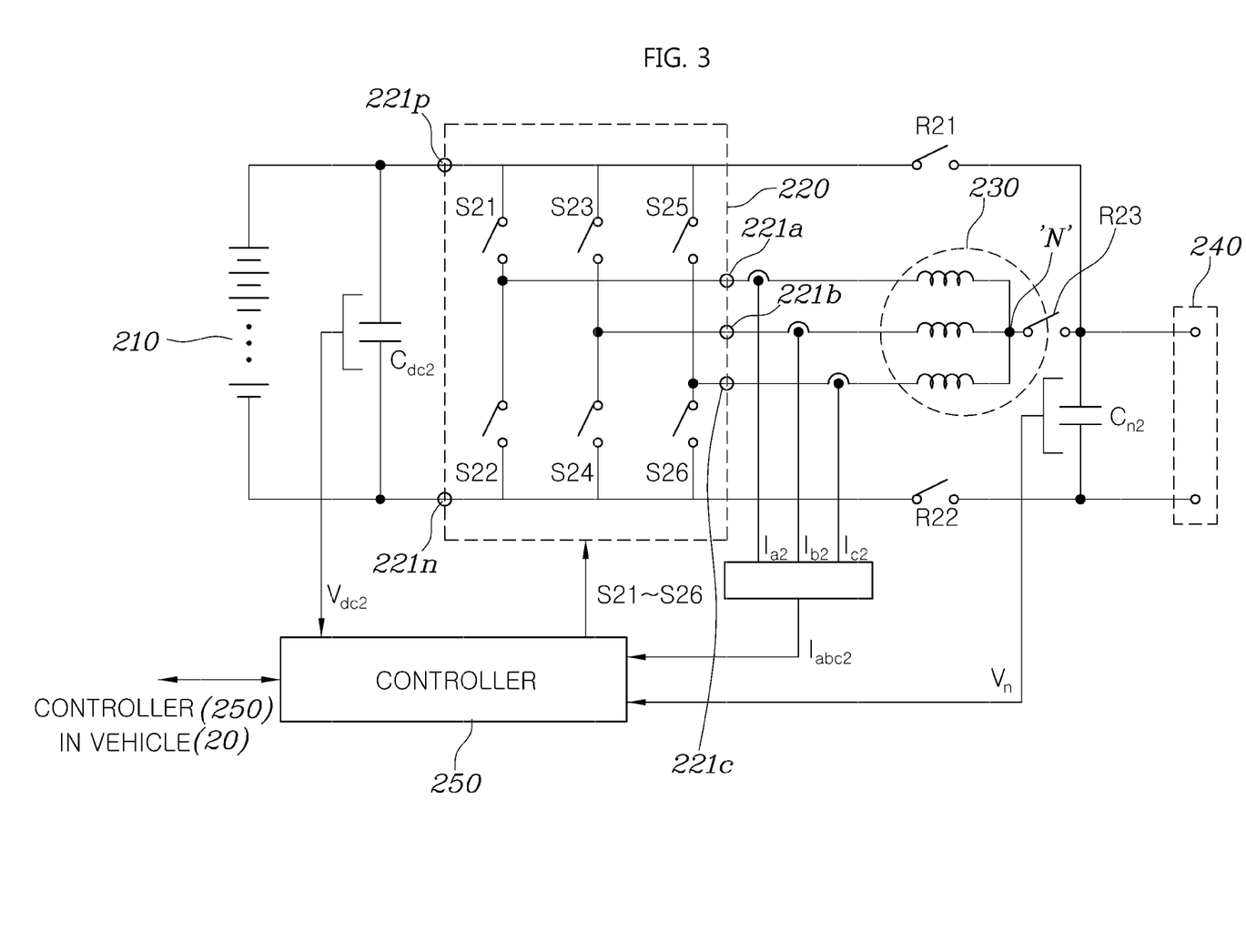

FIGS. 2 and 3 are detailed circuit diagrams of motor driving systems provided in respective vehicles and used for battery charging and charging power supply in a charging system using a motor driving system in some forms of the present disclosure.

First, a motor driving system provided in a first vehicle will be described with reference to FIG. 2. This motor driving system may be a system which controls and supplies a charging voltage or charging current in vehicle charging.

In general, a system for driving a motor 130 may include a battery 110 which is an energy storage device storing power for driving of the motor 130, and an inverter 120 which converts direct current (DC) power stored in the battery 110 into three-phase alternating current (AC) power and provides the converted AC power to the motor 130. The inverter 120 includes a DC link having a positive (+) terminal 121$p$ and a negative (−) terminal 121$n$ connected respectively to both terminals of the battery 110, and three legs connected in parallel between the positive terminal 121$p$ and negative terminal 121$n$ of the DC link. Each leg includes two switching devices (two of S11 to S16) connected in series, a connection node of which constitutes a corresponding one of a plurality of motor connection terminals 121$a$, 121$b$ and 121$c$ connected respectively to phases of the motor 130.

For motor driving, the switching devices S11 to S16 in the inverter 120 may be pulse width modulation-controlled such that current is provided to the motor 130 by an amount based on a current command corresponding to a torque of the motor 130 to be acquired through driving of the motor 130.

In some forms of the present disclosure, differently from in the above-described motor driving, external DC charging power may be applied to the DC link terminals 121$p$ and 121$n$ of the inverter 120, and the switching devices S11 to S16 of the inverter 120 may be controlled such that a DC voltage of a desired level is formed at a neutral point N1 of the motor 130 or DC charging current of a desired amount flows at the neutral point N1 of the motor 130. This control may be performed by a controller 150.

The two switching devices (for example, S11 and S12) included in one leg of the inverter 120 and one of three coils in the motor 130 connected to the connection node of the two switching devices S11 and S12 at its one end may constitute one DC converter circuit. As a result, three DC converter circuits consisting of the switching devices in the inverter 120 and the coils in the motor 130 may be connected in parallel between the battery 110 and the neutral point N1 of the motor 130. Therefore, the level of a voltage of the neutral point N1 (namely, a voltage of an external connection port 140) or the amount of current incoming/outgoing to/from the neutral point N1 may be appropriately controlled by controlling the switching devices S11 to S16 to operate the parallel-connected DC converter circuits simultaneously or selectively or operate the same in an interleaved manner.

In some forms of the present disclosure, the vehicle 10 may further include a relay R11 connected between the positive terminal of the battery 110 (or the positive terminal 121$p$ of the DC link of the inverter 120) and a positive terminal of the external connection port 140, a relay R12 connected between the negative terminal of the battery 110 (or the negative terminal 121$n$ of the DC link of the inverter 120) and a negative terminal of the external connection port 140, and a relay R13 connected between the neutral point N1 of the motor 130 and the positive terminal of the external connection port 140. The relays R11, R12 and R13 may be selectively open/closed when the voltage of the external connection port 140 should be determined to be the same as the voltage of the battery 110 or when the voltage of the external connection port 140 should be controlled through opening/closing of the switching devices of the inverter 120.

FIG. 3 shows a motor driving system in the other vehicle which is connected with the vehicle shown FIG. 2 to supply or receive charging power thereto or therefrom. The configuration of the vehicle shown in FIG. 3 is substantially the same as that of the vehicle shown in FIG. 2, and a detailed description thereof will thus be omitted. Nevertheless, those skilled in the art will readily understand the configuration of the motor driving system in the vehicle shown in FIG. 3.

In order to charge the battery 110 or 210 in one of the two vehicles 10 and 20 through power transmission/reception between the vehicles 10 and 20, the external connection ports 140 and 240 of the two vehicles 10 and 20 should be interconnected. After the external connection ports 140 and 240 of the two vehicles 10 and 20 are interconnected, the controller 150 or 250 in one of the vehicles 10 and 20 performs a control operation to determine a voltage Vn of the interconnected external connection ports 140 and 240, and the controller 150 or 250 in the other vehicle performs a control operation to determine the amount of current (charging current) incoming/outgoing between the external connection ports 140 and 240.

Figure 4:
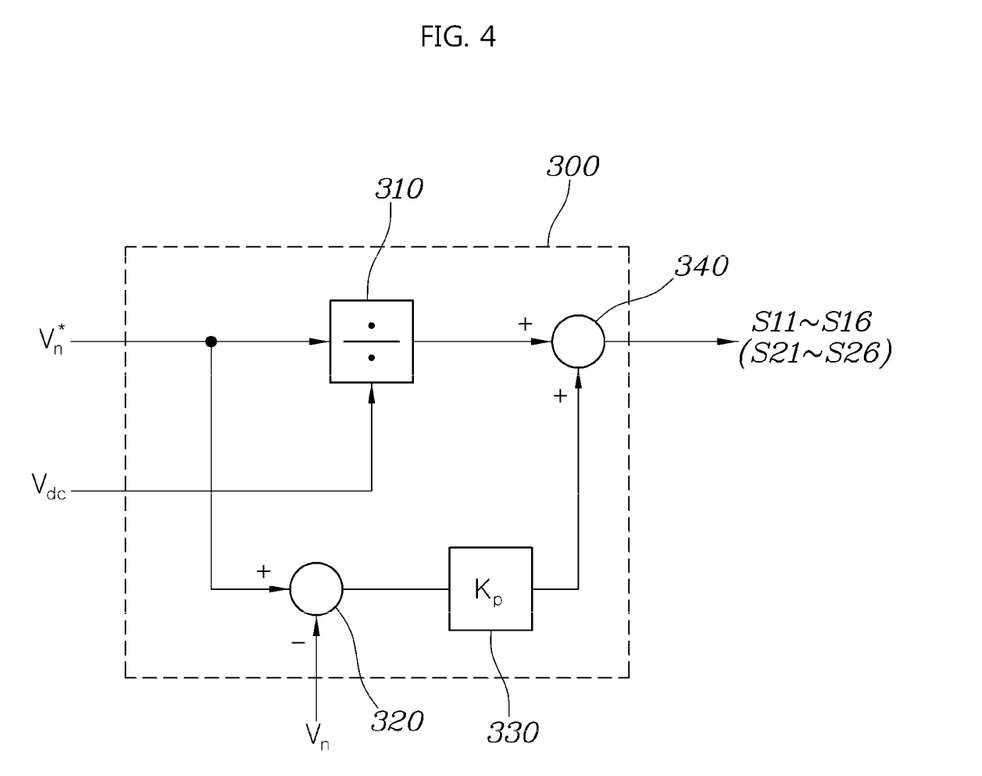
FIG. 4 is a detailed diagram of an example of a voltage controller applied to a controller provided in a vehicle and controlling a motor neutral point voltage in a motor driving system in one form of the present disclosure.
Figure 5:
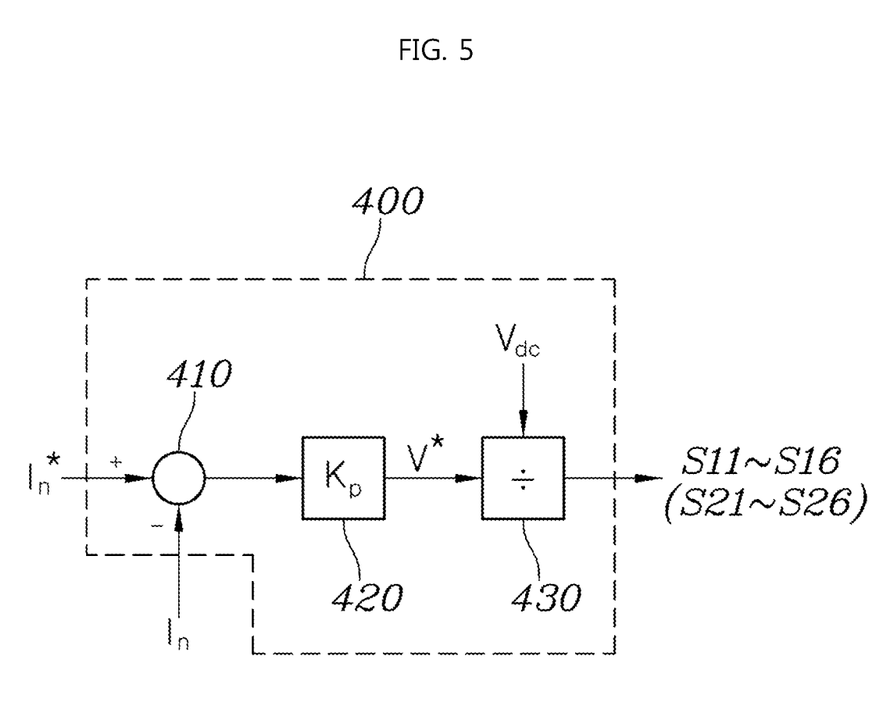
FIG. 5 is a detailed diagram of an example of a current controller applied to a controller provided in a vehicle and controlling charging current to a motor neutral point in a motor driving system in one form of the present disclosure.

FIG. 4 is a detailed diagram of an example of a voltage controller applied to a controller provided in a vehicle and controlling a motor neutral point voltage in a motor driving system in some forms of the present disclosure. FIG. 5 is a detailed diagram of an example of a current controller applied to a controller provided in a vehicle and controlling charging current to a motor neutral point in a motor driving system in some forms of the present disclosure.

The controller 150 or 250 in each vehicle may include the voltage controller as shown in FIG. 4 or the current controller as shown in FIG. 5. Through communication between the two controllers 150 and 250, one of the controllers 150 and 250 may operate as the voltage controller and the other may operate as the current controller.

Referring to FIG. 4, the voltage controller 300 included in the controller 150 or 250 may include a divider 310 for calculating a ratio between a target voltage Vn* of the external connection port 140 or 240 of the corresponding vehicle and a DC link voltage Vdc1 or Vdc2 of the inverter 120 or 220, a subtractor 320 for calculating a difference between the target voltage Vn* of the external connection port 140 or 240 and a measured voltage Vn of the external connection port 140 or 240, a controller 330 for generating a duty for convergence of a result of the calculation of the subtractor 320 on 0, and an adder 340 for adding a result of the calculation of the divider 310 and an output of the controller 330.

The ratio between the target voltage Vn* of the external connection port 140 or 240 and the DC link voltage Vdc1 or Vdc2 of the inverter 120 or 220 represents a step-up ratio of a step-up circuit constituted by the coils of the motor 130 or 230 and the switching devices S11 to S16 or S21 to S26 of the inverter 120 or 220. As a result, the calculation result of the divider 310 may be the step-up ratio of the step-up circuit, namely, the duty of the switching devices.

In some forms of the present disclosure, the switching duty of the switching devices S11 to S16 or S21 to S26 of the inverter 120 or 220 is determined by adding a component for controlling the measured voltage Vn of the external connection port 140 or 240 to become the predetermined target voltage Vn*, to the duty determined by the ratio between the target voltage Vn* of the external connection port 140 or 240 and the DC link voltage Vdc1 or Vdc2 of the inverter 120 or 220.

To this end, as shown in FIG. 4, in the voltage controller 300, the subtractor 320 calculates the difference between the target voltage Vn* of the external connection port 140 or 240 and the measured voltage Vn of the external connection port 140 or 240, and the controller 330 receives the difference calculated by the subtractor 320 and generates the duty for convergence of the calculated difference on 0.

Although FIG. 4 shows an example in which a proportional (P) controller is applied to the controller 330 for simplification in circuit configuration and execution of fast control calculation, a proportional-integral (PI) controller or a proportional-integral-derivative (PID) controller well-known to those skilled in the art may be selectively applied to the controller 330.

The voltage controller 300 finally generates the switching duty by adding the duty output from the controller 330 to the duty determined by the ratio between the target voltage Vn* of the external connection port 140 or 240 and the DC link voltage Vdc1 or Vdc2 of the inverter 120 or 220. The switching duty is the sum of the duty of the switching devices S11 to S16 or S21 to S26 determining the voltage conversion ratio of the DC converter circuits constituted by the inverter 120 or 220 and the coils of the motor 130 or 230 and the duty for controlling the voltage of the external connection port 140 or 240 to become the predetermined target voltage Vn* of the external connection port 140 or 240.

In the case of controlling on/off of the switching devices S11 to S16 or S21 to S26 of the inverter 120 or 220 using the switching duty, the DC link voltage Vdc1 or Vdc2 may be converted into the predetermined target voltage Vn* by the DC converter circuits constituted by the inverter 120 or 220 and the coils of the motor 130 or 230 while the voltage of the external connection port 140 or 240 follows the predetermined target voltage Vn*.

Referring to FIG. 5, the current controller 400 included in the controller 150 or 250 may include a subtractor 410 for calculating a difference between target current In* of the external connection port 140 or 240 and measured current In actually flowing in the external connection port 140 or 240, a controller 420 for generating a voltage command value V* for convergence of a result of the calculation of the subtractor 410 on 0, and a divider 430 for calculating a ratio between the DC link voltage Vdc1 or Vdc2 of the inverter 120 or 220 and the voltage command value V* to determine the switching duty of the inverter 120 or 220.

Similarly to in the voltage controller described above with reference to FIG. 4, in the current controller 400, the controller 420, such as a proportional (P) controller, a proportional-integral (PI) controller or a proportional-integral-derivative (PID) controller, derives the voltage command value V*, which is the target voltage of the external connection port 140 or 240, for convergence of the difference between the current In flowing in the external connection port 140 or 240 and the target current In* on 0. Then, a duty corresponding to the ratio between the derived voltage command value V* and the DC link voltage Vdc1 or Vdc2 of the inverter 120 or 220 is calculated, and the switching devices S11 to S16 or S21 to S26 of the inverter 120 or 220 are controlled based on the calculated duty. That is, the duty calculated by the controller 420 is a value corresponding to the voltage conversion ratio of the DC converter circuits constituted by the inverter 120 or 220 and the coils of the motor 130 or 230.

The examples of the voltage controller and current controller described above with reference to FIGS. 4 and 5 are for explanation of a fundamental concept of generating the switching duty of the switching devices S11 to S16 or S21 to S26 of the inverter 120 or 220, and those skilled in the art will appreciate that various modifications are possible.

The present disclosure also provides a charging method using the charging system configured as stated above. A charging method using a motor driving system in some forms of the present disclosure is implemented by the controllers 150 and 250 included in the two vehicles 10 and 20. It will be appreciated by those skilled in the art that the operation and effects of the charging system will be more clearly understood from the following description of the charging method using the motor driving system in some forms of the present disclosure.

Figure 6:
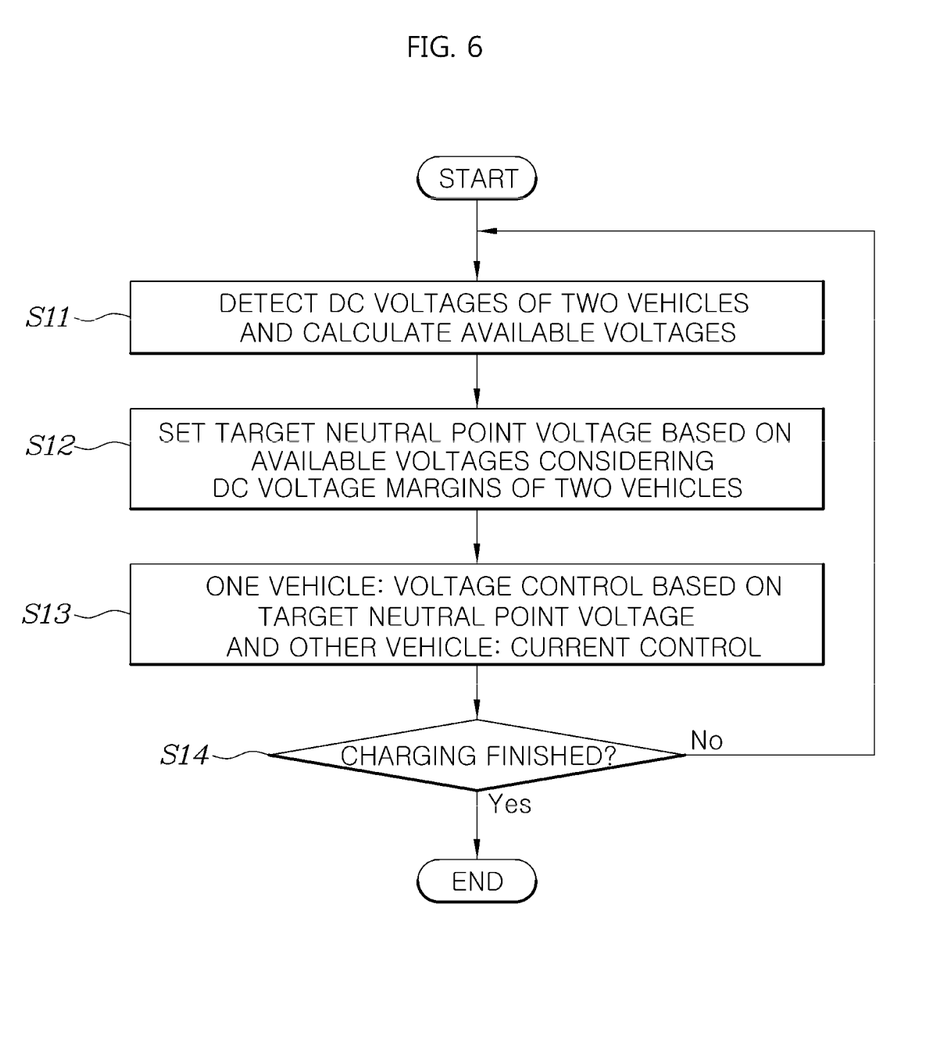
FIG. 6 is a flowchart illustrating a charging method using a motor driving system in one form of the present disclosure.

FIG. 6 is a flowchart illustrating a charging method using a motor driving system in some forms of the present disclosure.

Referring to FIG. 6, the charging method using the motor driving system in some forms of the present disclosure may start with step S11 of detecting, by the controllers 150 and 250 of the respective vehicles, the DC link voltage Vdc1 between the DC link terminals 121p and 121n of the inverter 120 and the DC link voltage Vdc2 between the DC link terminals 221p and 221n of the inverter 220, respectively, and calculating available voltages using the DC link voltages Vdc1 and Vdc2, respectively.

The DC link voltages Vdc1 and Vdc2 of the respective vehicles may be detected from voltage sensors, not shown.

Each available voltage means a maximum allowable voltage of the external connection port 140 or 240 considering a margin predetermined for the stable operation of the DC converter circuits consisting of the switching devices S11 to S16 or S21 to S26 of the inverter 120 or 220 and the coils of the motor 130 or 230.

When the DC converter circuits consisting of the switching devices S11 to S16 or S21 to S26 of the inverter 120 or 220 and the coils of the motor 130 or 230 operate ideally, the voltage of the external connection port 140 or 240 corresponding to the neutral point of the motor 130 or 230 may be equal to or lower than the DC link voltage Vdc1 or Vdc2 of the inverter 120 or 220. However, the maximum voltage of the external connection port 140 or 240 which can be generated by the DC converter circuits consisting of the switching devices S11 to S16 or S21 to S26 of the inverter 120 or 220 and the coils of the motor 130 or 230 is lower than the DC link voltage Vdc1 or Vdc2 of the inverter 120 or 220 due to the influence of various losses caused in the actually implemented circuits and the limitation of switching control. That is, a voltage obtained by subtracting a margin predetermined in consideration of system characteristics from the DC link voltage Vdc1 or Vdc2 is a maximum allowable voltage which can be output by the DC converter circuits consisting of the switching devices S11 to S16 or S21 to S26 of the inverter 120 or 220 and the coils of the motor 130 or 230, and this voltage is the very available voltage.

Then, the controllers 150 and 250 of the two vehicles set a target neutral point voltage, namely, the target voltage of the external connection port 140 or 240 based on the DC link voltages Vdc1 and Vdc2 of the inverters 120 and 220 of the two vehicles and the available voltages (S12).

Then, through communication between the controllers 150 and 250 of the two vehicles, one of the controllers 150 and 250 performs a voltage control operation such that the voltage of the external connection port 140 or 240 becomes the target voltage set in step S12, and the other performs a current control operation such that charging current of predetermined target current flows in the external connection port 140 or 240 (S13).

Some forms of the present disclosure provide schemes of setting the target voltage of the external connection port 140 or 240 and determining which vehicles will perform the voltage control operation and the current control operation. These schemes are shown in FIGS. 7 to 9.

Figure 7:
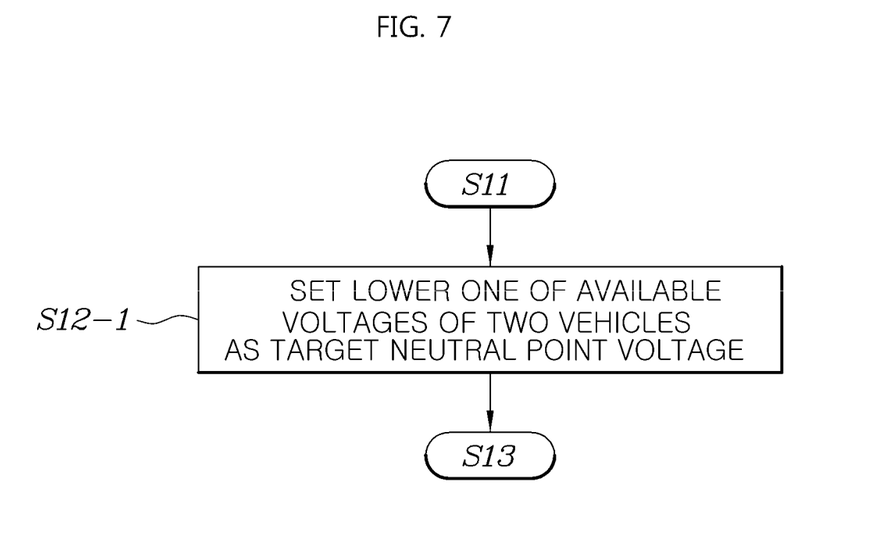
FIGS. 7 to 9 are flowcharts illustrating target voltage setting schemes and a vehicle control scheme applied to a charging method using a motor driving system in some forms of the present disclosure.
Figure 8:
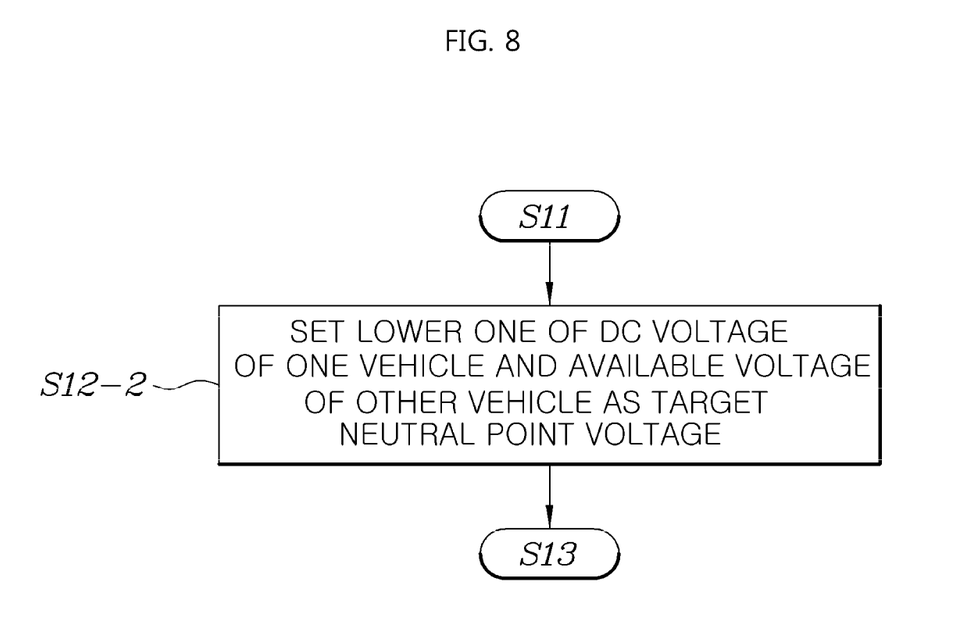
Figure 9:
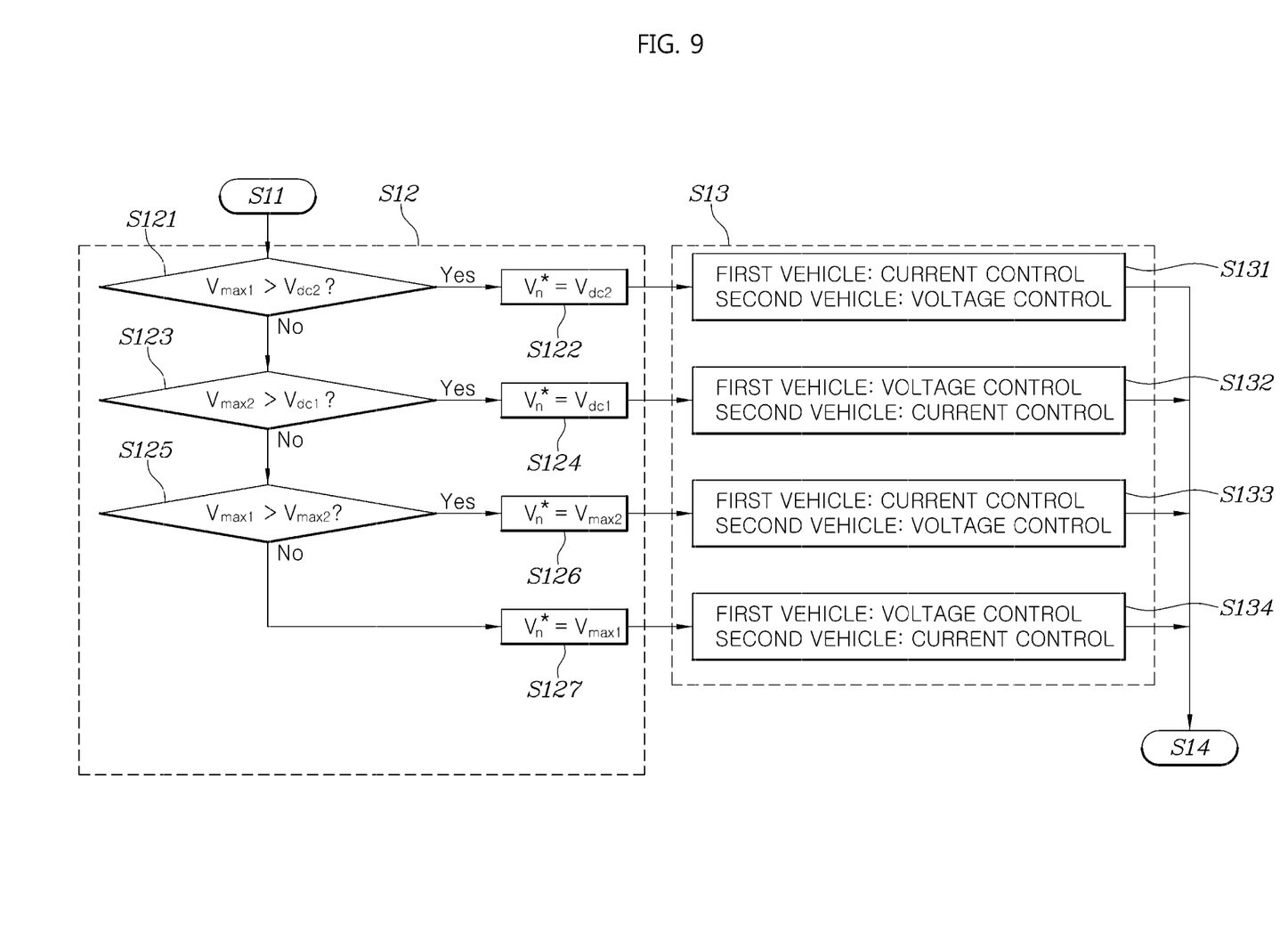

FIGS. 7 to 9 are flowcharts illustrating target voltage setting schemes and a vehicle control scheme applied to a charging method using a motor driving system in some forms of the present disclosure.

First, referring to FIG. 7, in a charging method using a motor driving system in some forms of the present disclosure, the target voltage of the external connection port 140 or 240 may be set to a lower one of the available voltages of the two vehicles (S12-1). As stated previously, each available voltage is a voltage obtained by subtracting a predetermined margin of a corresponding one of the two vehicles from the DC link voltage Vdc1 or Vdc2 of the inverter 120 or 220 of the corresponding vehicle. System efficiency decreases as the conversion ratio of the DC converter circuits increases. In this regard, provided that the conversion ratio is controlled to be as low as possible, the system efficiency may be improved. Accordingly, in order to minimize the conversion ratio, it is preferable to set the target voltage of the external connection port 140 or 240 to a lower one of the available voltages of the two vehicles. In step S12-1, the controllers 150 and 250 may compare each other's available voltages through communication therebetween and set a lower one of the two available voltages as the target voltage.

Next, referring to FIG. 8, in a charging method using a motor driving system in some forms of the present disclosure, the target voltage of the external connection port 140 or 240 may be set to a lower one of the available voltage of one vehicle and the DC link voltage of the other vehicle.

In the case where the DC link voltage is set as the target voltage, the voltages of the batteries 110 and 210 may be applied directly to the neutral points of the motors 130 and 230, namely, the external connection ports 140 and 240, respectively, using the relays R11 and R21 shown in FIGS. 2 and 3 (S12-2). Alternatively, the voltages of the batteries 110 and 210 may be applied directly to the neutral points of the motors 130 and 230, namely, the external connection ports 140 and 240, respectively, by closing the upper switching devices S11, S13 and S15 and S21, S23 and S25 of the respective legs among the switching devices of the inverters 120 and 220 and opening the lower switching devices S12, S14 and S16 and S22, S24 and S26 of the respective legs thereamong.

In this scheme, there is no need for pulse width control of the switching devices of the inverters 120 and 220, thereby enhancing charging efficiency through switching omission. In addition, the charging efficiency and charging speed may be increased by setting the voltages of the neutral points (or the external connection ports 140 and 240) to high voltages considering no margin. Further, the application of voltages to the neutral points (or the external connection ports 140 and 240) using the relays has the advantage of there being no necessity for considering unbalance of motor currents.

Next, referring to FIG. 9, in a charging method using a motor driving system in some forms of the present disclosure, the target voltage of the external connection port 140 or 240 may be set in the following manner. First, the DC link voltage Vdc1 or Vdc2 of one vehicle and the available voltage Vmax1 or Vmax2 of the other vehicle are compared with each other (S121 and S123). Then, when the DC link voltage Vdc1 or Vdc2 of one vehicle is not lower than the available voltage Vmax1 or Vmax2 of the other vehicle, the available voltages Vmax1 and Vmax2 of the two vehicles are compared with each other (S125), the target voltage of each of the neutral points (or the external connection ports 140 and 240) is set according to a result of the comparison, and a determination is thus made as to which vehicles will perform the voltage control operation and the current control operation (S131 to S134).

As shown in FIG. 9, when the available voltage Vmax1 of the first vehicle 10 is higher than the DC link voltage Vdc2 of the second vehicle 20 (S121), the DC link voltage Vdc2 of the second vehicle 20 is determined as the target voltage Vn* of each of the external connection ports 140 and 240 (S122), and the first vehicle 10 performs the current control operation and the second vehicle 20 performs the voltage control operation, thus performing charging (S131). At this time, the second vehicle 20 can keep the voltage of each of the external connection ports 140 and 240 at the DC link voltage Vdc2 by closing the relays R21 and R22 and opening the relay R23.

When the available voltage Vmax2 of the second vehicle 20 is higher than the DC link voltage Vdc1 of the first vehicle 10 (S123), the DC link voltage Vdc1 of the first vehicle 10 is determined as the target voltage Vn* of each of the external connection ports 140 and 240 (S124), and the second vehicle 20 performs the current control operation and the first vehicle 10 performs the voltage control operation, thus performing charging (S132). At this time, the first vehicle 10 can keep the voltage of each of the external connection ports 140 and 240 at the DC link voltage Vdc1 by closing the relays R11 and R12 and opening the relay R13.

In the case where the DC link voltage Vdc1 or Vdc2 of one vehicle is not lower than the available voltage Vmax1 or Vmax2 of the other vehicle, the available voltages Vmax1 and Vmax2 of the two vehicles are compared with each other (S125).

When the available voltage Vmax1 of the first vehicle 10 is higher, the available voltage Vmax2 of the second vehicle 20 is determined as the target voltage Vn* of each of the external connection ports 140 and 240 (S126), and the first vehicle 10 performs the current control operation and the second vehicle 20 performs the voltage control operation (S133). The second vehicle 20 can control the voltage of each of the external connection ports 140 and 240 to become the target voltage Vn*, by opening the relay R21 and closing the relays R22 and R23 and then pulse width-controlling the switching devices of the inverter 220.

In the case where the comparison result of step S125 indicates that the available voltage Vmax2 of the second vehicle 20 is higher, the available voltage Vmax1 of the first vehicle 10 is determined as the target voltage Vn* of each of the external connection ports 140 and 240 (S127), and the second vehicle 20 performs the current control operation and the first vehicle 10 performs the voltage control operation (S134). The first vehicle 10 can control the voltage of each of the external connection ports 140 and 240 to become the target voltage Vn*, by opening the relay R11 and closing the relays R12 and R13 and then pulse width-controlling the switching devices of the inverter 120.

As stated above, in some forms of the present disclosure shown in FIG. 9, the DC link voltages and the available voltages are compared with each other. When the DC link voltage of one vehicle is lower than the available voltage of the other vehicle, it is applied to each of the external connection ports 140 and 240 such that the voltage of each of the external connection ports 140 and 240 reaches the maximum voltage as closely as possible. The other vehicle having the available voltage higher than the DC link voltage of one vehicle performs the current control operation, thereby making it possible to sufficiently secure a margin for current control and thus prevent occurrence of a control disable situation.

In addition, the available voltages of the two vehicles are compared with each other. In this case, one vehicle having a lower available voltage performs the voltage control operation, thereby making it possible to minimize the voltage conversion ratio and thus enhance the charging efficiency, as compared with the case where the other vehicle performs the voltage control operation.

As is apparent from the above description, according to the charging system and method using the motor driving system, a vehicle requiring battery charging, such as an electric vehicle or a plug-in hybrid vehicle, may charge a battery using a neighboring vehicle even in the case where there is no separate charging equipment.

Particularly, according to the charging system and method using the motor driving system, power conversion may be performed using a motor and an inverter provided for driving of the motor without requiring a separate power conversion device for charging. In addition, the optimum charging efficiency may be obtained based on an available voltage or battery voltage state of each vehicle.

It will be appreciated by those skilled in the art that the effects achievable through the present disclosure are not limited to those that have been particularly described hereinabove and that other unmentioned effects of the present disclosure will be more clearly understood from the above detailed description.

The description of the disclosure is merely exemplary in nature and, thus, variations that do not depart from the substance of the disclosure are intended to be within the scope of the disclosure. Such variations are not to be regarded as a departure from the spirit and scope of the disclosure.

What is claimed is:

1. A charging system using a motor driving system comprising:
   a first vehicle; and
   a second vehicle,
   wherein each of the first vehicle and the second vehicle further comprises:
      a battery;
      an inverter comprising:
         a direct current (DC) link connected to the battery;
         a plurality of motor connection terminals; and
         a plurality of switching devices provided between the DC link and the plurality of motor connection terminals; and
      a motor comprising a plurality of coils that is connected to the plurality of motor connection terminals to form a neutral point; and
      a controller configured to:
         determine a duty of the plurality of switching devices; and
         control a voltage or current of the neutral point,
   wherein, when the battery in the first vehicle or the second vehicle is charged by electrically interconnecting the neutral point in the first vehicle and the neutral point in the second vehicle, the controller is further configured to:
      control the plurality of switching devices such that the voltage of each of the neutral points becomes a predetermined target voltage; and
      control the plurality of switching devices such that the current of each of the neutral points becomes a predetermined target current.

2. The charging system of claim 1, wherein the controller is configured to:
   compare available voltages of the first vehicle and the second vehicle obtained by subtracting predetermined margins from voltages of the DC links; and
   determine that a lower voltage of the available voltages is the predetermined target voltage.

3. The charging system of claim 2, wherein:
   the controller with the lower voltage of the available voltages is configured to control the duty of the plurality of switching devices such that the voltage of each of the neutral points becomes the predetermined target voltage, and
   the controller with a higher voltage of the available voltages is configured to control the duty of the plurality of switching devices such that the current of each of the neutral points becomes the predetermined target current.

4. The charging system of claim 1, wherein the controller is configured to:
   obtain the available voltages of the first vehicle and the second vehicle by subtracting predetermined margins from voltages of the DC links;
   compare the available voltage of the first vehicle with the DC link voltage of the second vehicle; and
   determine that the compared DC link voltage is the predetermined target voltage when the available voltage of the first vehicle is higher than the DC link voltage of the second vehicle.

5. The charging system of claim 4, wherein:
the controller of the second vehicle having the compared DC link voltage is configured to control the duty of the plurality of switching devices such that the voltage of each of the neutral points becomes the predetermined target voltage, and
the controller of the first vehicle having the compared available voltage is configured to control the duty of the plurality of switching devices such that the current of each of the neutral points becomes the predetermined target current.

6. The charging system of claim 4, wherein the second vehicle having the compared DC link voltage further comprises:
a relay provided between the neutral point and DC link, wherein the controller of the second vehicle having the compared DC link voltage is configured to close the relay such that the voltage of each of the neutral points becomes the compared DC link voltage, and the controller of the first vehicle having the compared available voltage is configured to control the duty of the plurality of switching devices such that the current of each of the neutral points becomes the predetermined target current.

7. A charging method using the charging system, comprising:
detecting, by controllers of a first vehicle and a second vehicle, voltages of the DC links of the first vehicle and the second vehicle;
obtaining available voltages of the first vehicle and the second vehicle by subtracting predetermined margins of the first vehicle and the second vehicle from the detected DC link voltages;
setting, by the controllers of the first vehicle and the second vehicle, a target voltage of each of the interconnected neutral points of motors based on the DC link voltages and the available voltages;
controlling, by a controller of the first vehicle, a plurality of switching devices of an inverter in the first vehicle such that the voltage of each of the neutral points becomes the target voltage; and
controlling, by a controller of the second vehicle, a plurality of switching devices of the inverter and the second vehicle such that the current of each of the neutral points becomes a predetermined target current.

8. The charging method of claim 7, wherein setting the target voltage comprises:
comparing the available voltages of the first vehicle and the second vehicle; and
determining that a lower voltage of the available voltages is the target voltage.

9. The charging method of claim 8, wherein controlling the plurality of switching devices comprises:
controlling, by the controller with the lower voltage of the available voltages, the duty of the plurality of switching devices such that the voltage of each of the neutral points becomes the target voltage; and
controlling, by the controller with a higher voltage of the available voltages, the duty of the plurality of switching devices such that the current of each of the neutral points becomes the predetermined target current.

10. The charging method of claim 7, wherein setting the target voltage comprises:
comparing the available voltage of the first vehicle with the DC link voltage of the second vehicle; and
determining that the compared DC link voltage is the target voltage when the available voltage of the first vehicle is higher than the DC link voltage of the second vehicle.

11. The charging method of claim 10, wherein controlling the plurality of switching devices comprises:
controlling, by the controller of the second vehicle having the compared DC link voltage, the duty of the plurality of switching devices such that the voltage of each of the neutral points becomes the target voltage; and
controlling, by the controller of the first vehicle having the compared available voltage, the duty of the plurality of switching devices such that the current of each of the neutral points becomes the predetermined target current.

12. The charging method of claim 10, wherein controlling the plurality of switching devices comprises:
closing, by the controller of the second vehicle having the compared DC link voltage, a relay provided between the neutral point and DC link such that the voltage of each of the neutral points becomes the compared DC link voltage; and
controlling, by the controller of the first vehicle having the compared available voltage, the duty of the plurality of switching devices such that the current of each of the neutral points becomes the predetermined target current.

* * * * *